United States Patent

Denny, Jr.

[15] 3,671,884

[45] June 20, 1972

[54] IMPROVED AMPLIFYING CIRCUIT

[72] Inventor: John H. Denny, Jr., Lynchburg, Va.

[73] Assignee: General Electric Company

[22] Filed: Sept. 29, 1970

[21] Appl. No.: 76,529

Related U.S. Application Data

[62] Division of Ser. No. 858,773, Sept. 17, 1969, Pat. No. 3,564,456.

[52] U.S. Cl. ............................332/16 T, 307/249, 325/318, 329/103, 330/10, 332/18

[51] Int. Cl. ............................H03f 3/38

[58] Field of Search ........................332/16 T, 16, 18, 19, 29; 307/249; 330/10; 325/318; 329/101, 103

[56] References Cited

UNITED STATES PATENTS

| | | | |
|---|---|---|---|
| 2,853,603 | 9/1958 | Herold | 329/101 X |
| 2,759,052 | 8/1956 | MacDonald et al. | 332/18 X |
| 3,030,585 | 4/1962 | Meth | 329/103 |
| 3,163,826 | 12/1964 | Kemper | 332/16 T X |
| 3,031,624 | 4/1962 | Moore et al. | 330/10 UX |
| 3,054,971 | 9/1962 | Khu | 332/16 T X |
| 3,564,456 | 2/1972 | Denny | 332/16 T |

*Primary Examiner*—Alfred L. Brody

*Attorney*—James J. Williams, Frank L. Neuhauser, Oscar B. Waddell and Joseph B. Forman

[57] ABSTRACT

Radiofrequency signals and lower frequency signals are separately amplified without mixing in a single transistor by applying the lower frequency signals through a filter to the transistor base and deriving the amplified lower frequency signals in an emitter-follower circuit, and by applying the radiofrequency signals to the transistor emitter and deriving the amplified radiofrequency signals from the transistor collector with the transistor base being connected in a common base configuration.

2 Claims, 2 Drawing Figures

FIG. I

INVENTOR:
JOHN H. DENNY, JR.

James J. Williams
HIS ATTORNEY.

INVENTOR:
JOHN H. DENNY, JR.

James J. Williams
HIS ATTORNEY.

IMPROVED AMPLIFYING CIRCUIT

BACKGROUND OF THE INVENTION

My invention relates to an improved amplifying circuit, and particularly to an improved circuit for amplifying radio frequency signals and lower frequency signals in a single transistor without mixing. This application is a division of U.S. Pat. No. 3,564,456, filed Sept. 17, 1969, and granted Feb. 16, 1971.

Frequency-modulated signals have many applications. A principle application is for communications, but another application is for testing a circuit. In such applications, a relatively wide deviation or band of frequencies, produced at a relatively high deviation rate, is desirable.

Accordingly, an object of my invention is to provide a new and improved circuit for producing frequency-modulated signals.

Another object of my invention is to provide a new and improved circuit for producing signals whose frequency can be varied at a relatively high rate.

Another object of my invention is to provide a new and improved circuit for producing a relatively wide frequency band of signals.

Another object of my invention is to provide a new and improved circuit for producing frequency-modulated signals having both a relatively large deviation or wide band and a relatively high deviation rate.

Another object of my invention is to provide a new circuit that can be used as a common-base RF amplifier and simultaneously as a low-frequency emitter-follower.

SUMMARY OF THE INVENTION

Briefly, these and other objects are achieved in accordance with my invention by a circuit having first and second radiofrequency amplifiers connected by a limiter. The output of the second radiofrequency amplifier is connected to a hybrid coupler having two outputs. One output of the coupler is connected through a variable phase-shift circuit to the input of the first radiofrequency amplifier so as to provide oscillations. These oscillations are frequency-modulated by varying the phase shift in the phase-shift circuit in response to a voltage applied to an emitter-follower circuit. The frequency-modulated signals are derived from the other output of the hybrid coupler, and are preferably applied to a buffer amplifier before being utilized. As will be explained, the circuit in accordance with my invention can utilize solid-state devices, and can produce signals having a relatively wide band (or deviation) of frequencies and a relatively high deviation rate.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1:
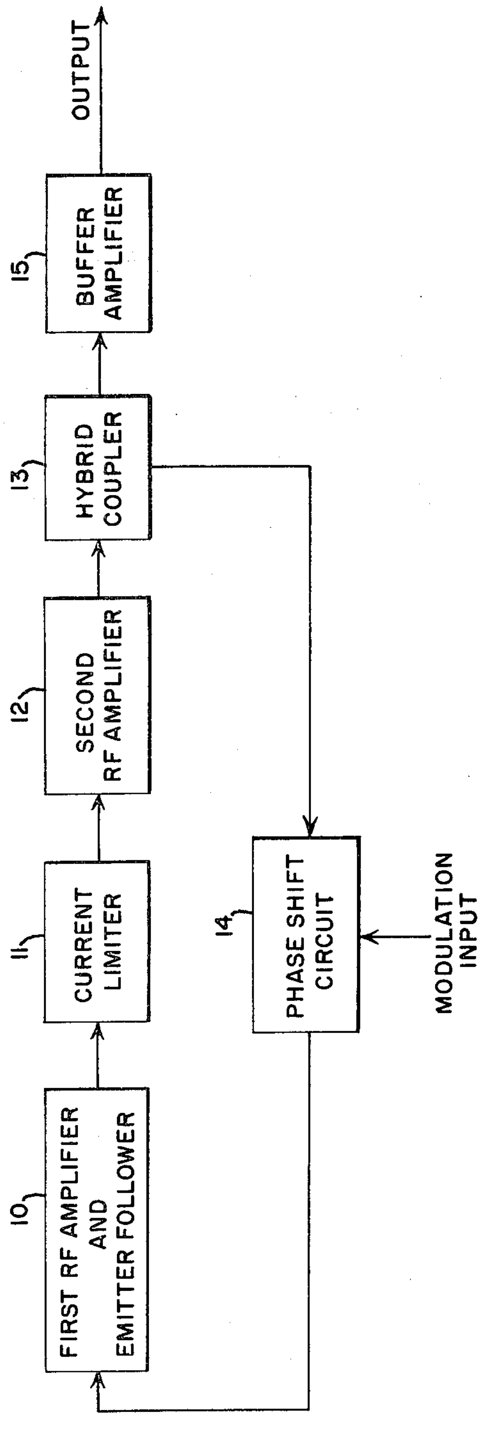
FIG. 1 shows a simplified block diagram of a circuit for producing frequency-modulated signals in accordance with my invention.

With reference to FIG. 1, my circuit comprises a first common-base radiofrequency (RF) amplifier 10 which is simultaneously operated as an emitter-follower for the modulation frequencies. The amplifier output is connected through a limiter 11 to a second radiofrequency (RF) amplifier 12. The RF amplifiers 10, 12 are made as broadband as possible so that they can provide uniform amplification and a linear phase response over the desired band of frequencies. The output of the second amplifier 12 is connected to a hybrid coupler 13 which has two outputs. One output of the hybrid coupler 13 is connected through a phase-shift circuit 14 back to the input of the first RF amplifier 10. Oscillation occurs when signals from the first output of the hybrid coupler 13 are fed back to the input of the first RF amplifier 10 with the proper phase and amplitude. The exact frequency of oscillation depends upon the phase-shift introduced by the phase-shift circuit 14. This phase shift is controlled by a signal or modulation voltage applied to the phase-shift circuit 14 to provide frequency-modulated signals. An output may be derived from the circuit at the second or other output of the hybrid coupler 13, and is preferably connected to a buffer-amplifier 15 before being utilized in some desired manner. The circuit shown in the block diagram can produce a relatively wide band of frequencies having a relatively high deviation rate.

Figure 2:
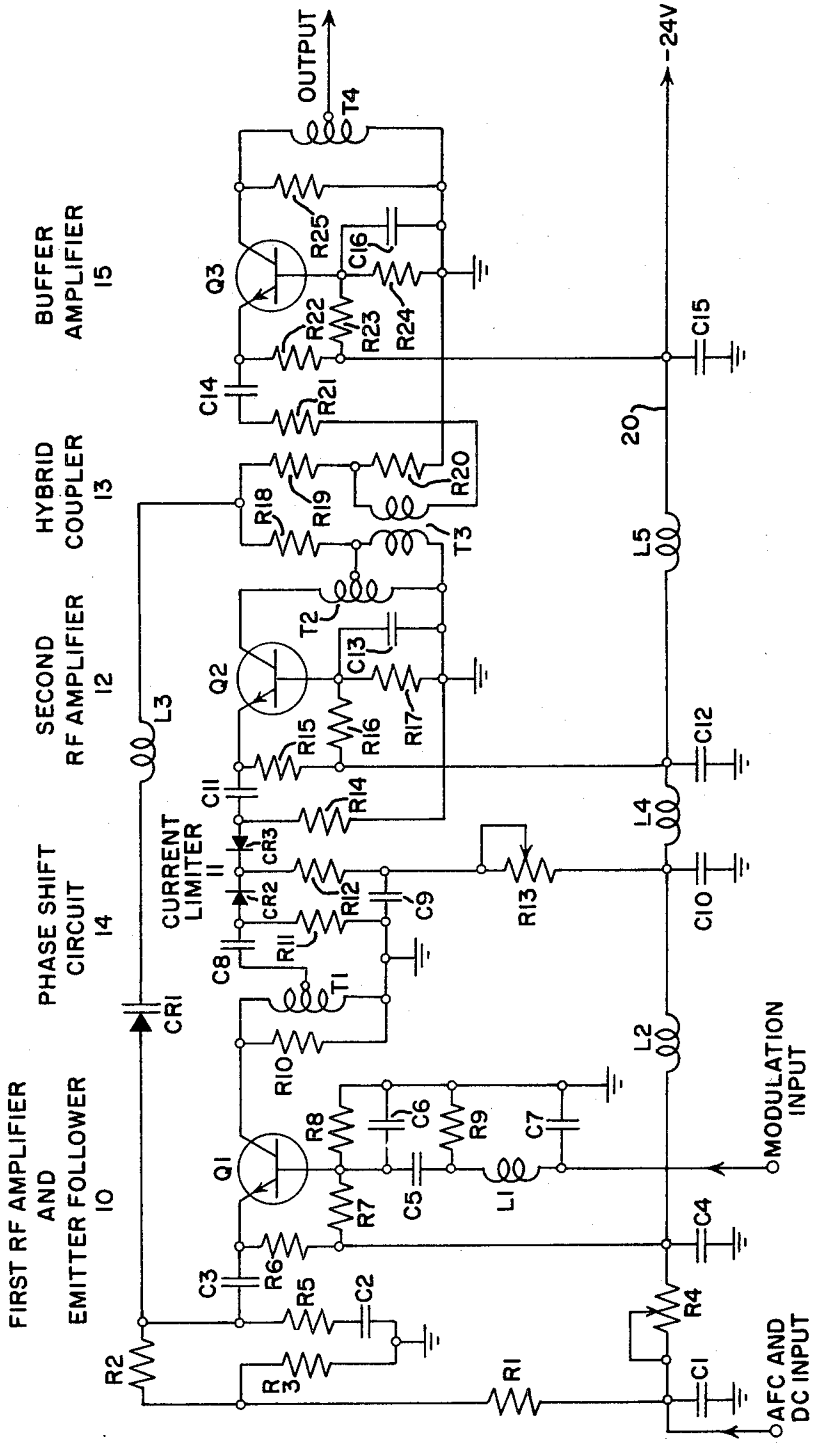
FIG. 2 shows a schematic diagram of a preferred embodiment of a circuit for producing frequency-modulated signals in accordance with my invention.

With reference to FIG. 2, I have shown a schematic diagram of a preferred embodiment of a circuit for producing frequency-modulated signals in accordance with my invention. The circuit elements or blocks of FIG. 1 are generally indicated in FIG. 2. The circuit of FIG. 2 operates from a suitable source of direct-current potential which is applied to a voltage bus 20. Filter inductors L2, L4, L5 and filter capacitors C1, C4, C10, C12, C15 connect the bus 20 to various parts of the circuit. For the particular circuit shown in FIG. 2, the source is 24 volts negative with respect to a point of reference potential such as the ground indicated. The first RF amplifier and emitter-follower 10 comprises an NPN-type transistor Q1 which is connected in a common base configuration for the RF frequencies and as an emitter-follower for the modulation frequencies. The RF voltage or signal from the phase-shift circuit 14 is connected through a capacitor C3 to the emitter of the transistor Q1. A resistor R5 and a capacitor C2 damp out UHF oscillations inherent in common-base circuits. The base of the transistor Q1 is connected through a capacitor C5 and an inductor L1 to a suitable modulation voltage, which may be a varying sweep voltage or modulation signal. Three resistors R6, R7, and R8 provide bias voltages at the emitter and base of transistor Q1 so that it is biased as a Class A common-base amplifier at the RF center frequency. A capacitor C6 is provided to ground the base of the transistor Q1 at radio frequencies, but to serve as one element of a low-pass pi filter to the modulation frequencies. The inductor L1 and a capacitor C7 serve as the other elements of the filter, and a resistor R9 terminates the filter in the desired impedance. The resistor R8 is made larger than the resistor R9, so that at the baseband frequencies the resistor R8 can be neglected. The resistor R6 serves as the emitter-resistor at the modulation frequencies. The modulation signal is supplied at the terminal indicated, and passes through the filter, the base-emitter path of the transistor Q1, and the capacitor C3 to the phase-shift circuit. Thus, the emitter of the transistor Q1 serves as an RF input and a modulation frequency output. Three resistors R1, R3, R4 are connected between the voltage bus 20 and ground to provide bias for the first RF amplifier and emitter-follower 10. These resistors R1, R3, R4 are chosen so that they are relatively large and can be ignored or neglected at the baseband modulation frequencies and at radiofrequencies. The bias is connected by a resistor R2 to the phase-shift circuit 14. The common point of the resistors R1, R4 can be used for automatic frequency control (AFC) or as a D.C. modulation input. The hybrid coupler 13 provides a return to ground for the baseband frequencies and the bias. The RF output from the transistor Q1 is applied to the current limiter 11 through an RF impedance-matching transformer T1 and a capacitor C8. A resistor R10 is provided as a damping resistor to make the response wideband.

The current-limiter 11 comprises two Schottky barrier diode rectifiers CR2, CR3 having their cathodes connected together, and forward-biased by a connection to the bus 20 through a fixed resistor R12 and a variable resistor R13. The current limiter 11 also includes an input resistor R11, a bypass capacitor C9, and an output resistor R14. The current-limiter 11 serves to remove any incidental amplitude modulation, and by limiting the level of oscillation, it allows the RF amplifiers 10, 12 to operate at a constant operation point in Class A. The signals from the current-limiter 11 are applied by a capacitor C11 to the second RF amplifier 12 at the emitter of a transistor Q2. The transistor Q2 is an NPN-type transistor which is also connected as a Class-A common-base amplifier. These connections include resistors R15, R16, R17 and a capacitor C13. The output from the transistor Q2 is supplied to an impedance-matching transformer T2, and the output of the transformer T2 is supplied to the coupler 13. The coupler 13 includes a balun transformer T3 and resistors R18, R19, R20. The junction of the resistors R18, R19 serves as one output for the hybrid coupler 13, and is connected through the phase-shift circuit 14 (an inductor L3 and a hyperabrupt diode CR1) back to the emitter of the transistor Q1.

The hyperabrupt diode CR1 is indicated schematically with the diode symbol and the capacitor symbol to indicate that it has a capacity which varies with applied voltage. The applied voltage may come from the AFC and DC input, or from the modulation input and emitter-follower circuit. This variable capacity serves as the modulation means, and introduces a phase shift which varies with applied modulation voltage. The reactance of the inductor L3 is chosen to resonate at the RF center frequency with the net reactance of the diode CR1 and the input reactance of transistor Q1. Its reactance can be neglected at the modulation frequencies.

The circuit, as described thus far, can produce oscillations because the output or part of the output from the transistor Q2 is coupled in the proper phase relation through the phase-shift circuit back to the input of the transistor Q1.

A second output from the directional coupler 13 is provided at the secondary winding of the balun transformer T3. This output is connected through a resistor R21 and a capacitor C14 to the buffer-amplifier 15. The buffer-amplifier 15 includes an NPN-type transistor Q3 which is also biased and connected as a Class-A, common-base amplifier. The connections include resistors R22, R23, R24, and a capacitor C16. The amplifier output is supplied at the collector, which may be connected to an output transformer T4. A damping resistor R25 is provided to make the response wideband.

A circuit having the configuration shown in FIG. 2 was actually constructed and operated with the components having the following values:

| Component | Value |
|---|---|
| Transistor Q1 | Type 2N918 |
| Transistor Q2 | Type 2N918 |
| Transistor Q3 | Type 2N918 |
| Resistor R1 | 5,000 ohms |
| Resistor R2 | 5,000 ohms |
| Resistor R3 | 2,000 ohms |
| Resistor R4 | 10,000 ohms |
| Resistor R5 | 200 ohms |
| Resistor R6 | 2,200 ohms |
| Resistor R7 | 10,000 ohms |
| Resistor R8 | 6,800 ohms |
| Resistor R9 | 75 ohms |
| Resistor R10 | 1,000 ohms |
| Resistor R11 | 200 ohms |
| Resistor R12 | 1,000 ohms |
| Resistor R13 | 1,000 ohms |
| Resistor R14 | 200 ohms |
| Resistor R15 | 2,200 ohms |
| Resistor R16 | 10,000 ohms |
| Resistor R17 | 6,800 ohms |
| Resistor R18 | 24 ohms |
| Resistor R19 | 24 ohms |
| Resistor R20 | 24 ohms |
| Resistor R21 | 20 ohms |
| Resistor R22 | 2,200 ohms |
| Resistor R23 | 10,000 ohms |
| Resistor R24 | 6,800 ohms |
| Resistor R25 | 240 ohms |
| Capacitor C1 | .01 microfarad |
| Capacitor C2 | 12 micromicrofarads |
| Capacitor C3 | 47 microfarads |
| Capacitor C4 | .01 microfarad |
| Capacitor C5 | 100 microfarads |
| Capacitor C6 | 150 micromicrofarads |
| Capacitor C7 | 150 micromicrofarads |
| Capacitor C8 | 150 micromicrofarads |
| Capacitor C9 | .01 microfarad |
| Capacitor C10 | .01 microfarad |
| Capacitor C11 | 150 micromicrofarads |
| Capacitor C12 | .01 microfarad |
| Capacitor C13 | .01 microfarad |
| Capacitor C14 | 150 micromicrofarads |
| Capacitor C15 | .01 microfarad |
| Capacitor C16 | .01 microfarad |
| Inductor L1 | 1.7 microhenries |
| Inductor L2 | 3.3 microhenries |
| Inductor L3 | 0.5 microhenry |
| Inductor L4 | 3.3 microhenries |
| Inductor L5 | 3.3 microhenries |
| Diode CR1 | NEC Type 1S1617 |
| Diode CR2 | TI Type TIV305 |
| Diode CR3 | TI Type TIV305 |

With a circuit having these values connected as shown in FIG. 2, a center radiofrequency of approximately 70 Megahertz was provided. A modulation signal of 0.46 volt produced a frequency deviation of ±10 Megahertz on either side of the center frequency of 70 Megahertz. This is a total frequency swing of 20 Megahertz, which is relatively wide band for such a relatively small modulation voltage. The modulation frequency response was flat within ±0.5 db from 10 hertz to 10 Megahertz. The linearity distortion was 1.5 percent at ±10 Megahertz. These improved results are the result of my novel circuit, and particularly the RF amplifier and emitter-follower 10.

It will thus be seen that my invention provides a new and improved circuit that produces frequency-modulated signals for any desired purpose. While I have shown only one embodiment of my circuit, persons skilled in the art will appreciate that modifications and changes may be made. Therefore, while the invention has been described with reference to a particular embodiment, it is to be understood that modifications may be made without departing from the spirit of the invention or from the scope of the claims.

What I claim as new and desire to secured by Letters Patent of the United States is:

1. An improved circuit for separately amplifying radio frequency signals and lower frequency signals comprising:

a. a transistor having an emitter, a base, and a collector;

b. first and second terminals for supplying direct current power;

c. a resistor bias circuit connected between said first and second terminals;

d. means connecting a selected point on said bias circuit to said transistor base;

e. a bias and lower frequency output resistor connected between a point on said bias circuit and said transistor emitter;

f. a filter circuit having an input for receiving lower frequency signals for amplification and having an output;

g. said filter circuit including means for passing said lower frequency signals and for blocking direct current and said radiofrequency signals;

h. means connecting said filter circuit output to said transistor base;

i. a capacitor connected to said transistor emitter for supplying radio frequency signals to be amplified, and for deriving amplified lower frequency signals;

j. means connected to said transistor collector for deriving amplified radio frequency signals therefrom;

k. and means connected between said transistor collector and one of said terminals for supplying direct current power to said transistor.

2. The improved circuit of claim 1 wherein said filter circuit comprises an inductor and a capacitor connected in series between said filter circuit input and output, and comprises a shunt capacitor connected between said series circuit and one of said terminals.

* * * * *